United States Patent
Meyer et al.

(10) Patent No.: US 10,035,884 B2
(45) Date of Patent: Jul. 31, 2018

(54) POLYSILOXANE-POLYCARBONATE BLOCK COCONDENSATES WITH IMPROVED RHEOLOGICAL PROPERTIES

(71) Applicant: Covestro Deutschland AG, Leverkusen (DE)

(72) Inventors: Alexander Meyer, Düsseldorf (DE); Klaus Horn, Dormagen (DE); Reiner Rudolf, Langenfeld (DE); Ulrich Liesenfelder, Bergisch Gladbach (DE); Thomas König, Leverkusen (DE); Alexander Karbach, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 18 days.

(21) Appl. No.: 15/113,514

(22) PCT Filed: Jan. 26, 2015

(86) PCT No.: PCT/EP2015/051430
§ 371 (c)(1),
(2) Date: Jul. 22, 2016

(87) PCT Pub. No.: WO2015/113916
PCT Pub. Date: Aug. 6, 2015

(65) Prior Publication Data
US 2017/0009021 A1    Jan. 12, 2017

(30) Foreign Application Priority Data
Jan. 30, 2014 (EP) .................................... 14153223

(51) Int. Cl.
*C08G 64/18* (2006.01)
*C08G 77/448* (2006.01)

(52) U.S. Cl.
CPC .......... *C08G 77/448* (2013.01); *C08G 64/186* (2013.01)

(58) Field of Classification Search
CPC ............................ C08G 64/186; C08G 77/448
See application file for complete search history.

(56) References Cited

U.S. PATENT DOCUMENTS

| | | |
|---|---|---|
| 3,189,662 A | 6/1965 | Vaughn, Jr. |
| 3,419,634 A | 12/1968 | Vaughn, Jr. |
| 4,584,360 A | 4/1986 | Paul et al. |
| 4,707,393 A | 11/1987 | Vetter |
| 4,950,081 A | 8/1990 | List |
| 4,982,014 A | 1/1991 | Freitag et al. |
| 5,104,723 A | 4/1992 | Freitag et al. |
| 5,227,449 A | 7/1993 | Odell et al. |
| 5,235,026 A | 8/1993 | Wulff et al. |
| 5,288,778 A | 2/1994 | Schmitter et al. |
| 5,334,358 A | 8/1994 | Schuchardt et al. |
| 5,399,012 A | 3/1995 | Schuchardt et al. |
| 5,407,266 A | 4/1995 | Dötsch et al. |
| 5,504,177 A | 4/1996 | King, Jr. et al. |
| 5,505,536 A | 4/1996 | Schuchardt |
| 5,658,075 A | 8/1997 | Schebesta et al. |
| 5,669,710 A | 9/1997 | Schebesta et al. |

(Continued)

FOREIGN PATENT DOCUMENTS

| | | |
|---|---|---|
| DE | 334782 C | 3/1921 |
| DE | 3832396 A1 | 2/1990 |

(Continued)

OTHER PUBLICATIONS

International Search Report for PCT/EP2015/051430 dated Apr. 7, 2015.

*Primary Examiner* — David J Buttner
(74) *Attorney, Agent, or Firm* — Drinker Biddle & Reath LLP

(57) ABSTRACT

The present invention relates to polysiloxane-polycarbonate block cocondensates derived from a continuous melt transesterification process comprising polysiloxane blocks of the formula (1)

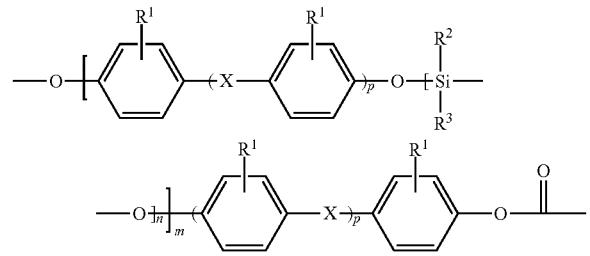

Figure 1:
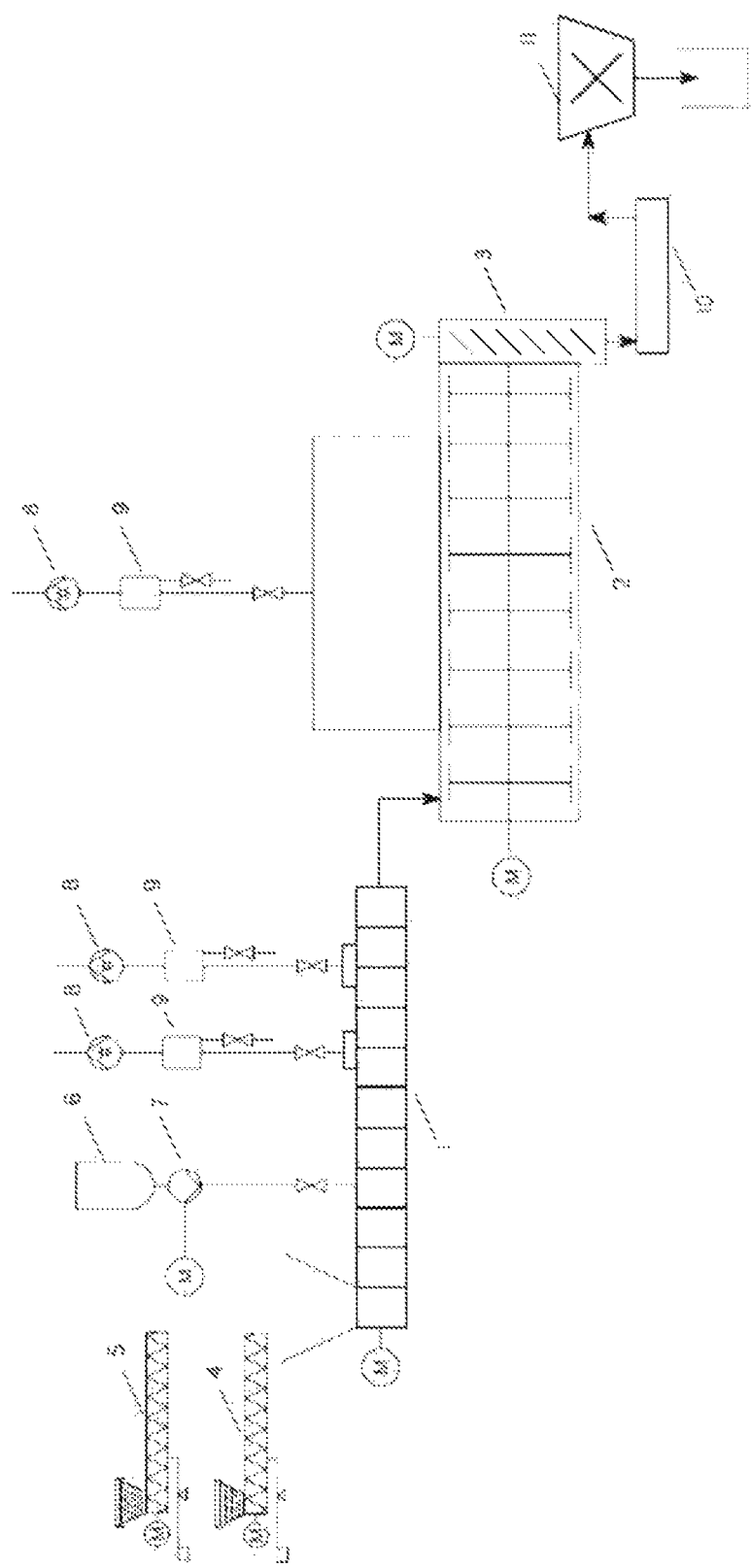

and polycarbonate blocks having recurring units of the formula (2)

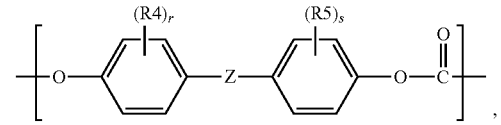

having improved rheological properties and good mechanical properties as well as to mouldings and extrudates made from these polysiloxane-polycarbonate block cocondensates and wherein the polysiloxane-polycarbonate block cocondensate has a siloxane domain distribution (diameter of siloxane domains) from 200 nm to 1 μm measured by atomic force microscopy and light microscopy which is in the range of 0.01%-2.5%, based on the total number of siloxane domains.

15 Claims, 2 Drawing Sheets

(56) References Cited

U.S. PATENT DOCUMENTS

| | | |
|---|---|---|
| 5,783,651 A | 7/1998 | König et al. |
| 5,821,380 A | 10/1998 | Holderbaum et al. |
| 5,846,659 A | 12/1998 | Löwer et al. |
| 5,876,115 A | 3/1999 | Schebesta et al. |
| 5,883,165 A | 3/1999 | Kröhnke et al. |
| 6,066,700 A | 5/2000 | König et al. |
| 6,892,723 B2 | 5/2005 | Anschütz et al. |
| 7,799,889 B2 | 9/2010 | Meyer et al. |
| 8,044,122 B2 | 10/2011 | Ruediger et al. |
| 8,158,745 B2 | 4/2012 | Wehrmann et al. |
| 2005/0024987 A1 | 2/2005 | Kunz et al. |
| 2005/0288407 A1 | 12/2005 | Heuer et al. |
| 2006/0014919 A9* | 1/2006 | Venderbosch ......... C08L 69/00 528/196 |
| 2008/0103267 A1 | 5/2008 | Hurst et al. |
| 2012/0271009 A1* | 10/2012 | Higaki ................ C08G 64/186 525/464 |

FOREIGN PATENT DOCUMENTS

| | | |
|---|---|---|
| DE | 38 33 953 A1 | 4/1990 |
| DE | 19710081 A1 | 9/1998 |
| DE | 10311063 A1 | 9/2004 |
| DE | 102007011069 A1 | 9/2008 |
| DE | 102008019503 A1 | 10/2009 |
| EP | 0 110 221 A2 | 6/1984 |
| EP | 0 110 238 A2 | 6/1984 |
| EP | 122 535 A2 | 10/1984 |
| EP | 222 599 A2 | 5/1987 |
| EP | 329 092 A1 | 8/1989 |
| EP | 460 466 A1 | 12/1991 |
| EP | 0 500 496 A1 | 8/1992 |
| EP | 517 068 A1 | 12/1992 |
| EP | 0517044 A2 | 12/1992 |
| EP | 528 210 A1 | 2/1993 |
| EP | 638 354 A1 | 2/1995 |
| EP | 0 716 919 A2 | 6/1996 |
| EP | 715 881 A2 | 6/1996 |
| EP | 715 882 A2 | 6/1996 |
| EP | 798 093 A2 | 10/1997 |
| EP | 0839623 A1 | 5/1998 |
| EP | 1308084 A1 | 5/2003 |
| EP | 1 609 818 A2 | 12/2005 |
| FR | 1561518 A | 3/1969 |
| GB | 1229482 A | 4/1971 |
| JP | 2013221046 A | 10/2013 |
| WO | WO-96/15102 A2 | 5/1996 |
| WO | WO-0201114 A1 | 1/2002 |
| WO | WO-03035235 A1 | 5/2003 |
| WO | WO-2006/072344 A1 | 7/2006 |

\* cited by examiner

POLYSILOXANE-POLYCARBONATE BLOCK COCONDENSATES WITH IMPROVED RHEOLOGICAL PROPERTIES

CROSS-REFERENCE TO RELATED APPLICATIONS

This application is a national stage application (under 35 U.S.C. § 371) of PCT/EP2015/051430, filed Jan. 26, 2015, which claims benefit of European Application No. 14153223.4, filed Jan. 30, 2014, both of which are incorporated herein by reference in their entirety.

The present invention relates to polysiloxane-polycarbonate block cocondensates comprising particular siloxane domains and having improved theological properties and good mechanical properties as well as to mouldings and extrudates made from these polysiloxane-polycarbonate block cocondensates.

BACKGROUND OF THE INVENTION

It is known that polysiloxane-polycarbonate block cocondensates have good properties with regard to low-temperature impact strength or low-temperature notched impact strength, chemical resistance and outdoor weathering resistance, and to ageing properties and flame retardancy. In terms of these properties, they are in some cases superior to the conventional polycarbonates (homopolycarbonate based on bisphenol A).

The industrial preparation of these cocondensates proceeds from the monomers, usually via the interfacial process with phosgene. Also known is the preparation of these siloxane cocondensates via the melt transesterification process using diphenyl carbonate. However, these processes have the disadvantage that the industrial plants used therefor are used for preparation of standard polycarbonate and therefore have a high plant size. The preparation of specific block coconderisates in these plants is often economically unviable because of the smaller volume of these products. Moreover, the feedstocks required for preparation of the cocondensates, for example polydimethylsiloxanes, impair the plant, since they can lead to soiling of the plant or of the solvent circuits. In addition, toxic feedstocks such as phosgene are required for the preparation, or these processes entail a high energy demand.

The preparation of polysiloxane-polycarbonate block copolymers via the interfacial process is known from the literature and is described, for example, in U.S. Pat. No. 3,189,662, U.S. Pat. No. 3,419,634, DE-B 3 34 782 and EP 122 535.

The preparation of polysiloxane carbonate block copolymers by the melt transesterification process from bisphenol, diaryl carbonate and silanol end-terminated polysiloxanes in the presence of a catalyst is described in U.S. Pat. No. 5,227,449. The siloxane compounds used are polydiphenyl- or polydimethylsiloxane telomers with silanol end groups. It is known, however, that such dimethylsiloxanes having silanol end groups, in contrast to diphenylsilane with silanol end groups, have an increasing tendency to self-condensation with decreasing chain length in an acidic or basic medium, such that incorporation into the copolymer as it forms is made more difficult as a result. Cyclic siloxanes formed in this process remain in the polymer and have an exceptionally disruptive effect in applications in the electrical/electronics sector.

U.S. Pat. No. 5,504,177 describes the preparation of a block copolysiloxane carbonate via melt transesterification from a carbonate-terminated silicone with bisphenol and diaryl carbonate. Because of the great incompatibility of the siloxanes with bisphenol and diaryl carbonate, homogeneous incorporation of the siloxanes into the polycarbonate matrix can be achieved only with very great difficulty, if at all, via the melt transesterification process. Furthermore, the preparation of the block cocondensates proceeding from the monomers is very demanding.

DE 19710081 describes a process for preparing the cocondensates mentioned in a melt transesterification process proceeding from an oligocarbonate and a specific hydroxyarylsiloxane. The preparation of the oligocarbonate is also described in this application. However, the industrial scale preparation of oligocarbonates for preparation of relatively small-volume specific cocondensates is very costly and inconvenient. Furthermore, the resulting material is unsuitable for the preparation of cocondensates, since the high concentration of OH end groups and other impurities, for example catalyst residue constituents, lead to a poor colour in the end product. The process described in DE 19710081 is a batchwise process which is difficult to accomplish the process in an industrial scale Nowadays, polycarbonates are industrially manufactured from the monomers, i.e. from low molecular weight bisphenols and organic carbonates such as diphenyl carbonate, which is very demanding and requires a costly standard polycarbonate synthesis or copolycarbonate synthesis in a corresponding industrial scale plant.

Disadvantages of all these processes are the use of organic solvents in at least one step of the synthesis of the silicone-polycarbonate block copolymers, the use of phosgene as a feedstock and/or the inadequate quality of the cocondensate. More particularly, the synthesis of the cocondensates proceeding from the monomers is very demanding, both in the interfacial process and particularly in the melt transesterification process. For example, in the case of the melt process, a small relative underpressure and low temperatures have to be employed, in order to prevent vaporization and hence removal of the monomers. Only in later reaction stages in which oligomers with higher molar mass have formed can lower pressures and higher temperatures be employed. This means that the reaction has to be conducted over several stages and that the reaction times are accordingly long. Furthermore, there is a risk that production process residues such as low-molecular siloxane components remain in the co-condensate.

JP 2013221046 describes polycarbonate-siloxane block-copolymers having an average siloxane domain size of about 0.5 to 40 nm. These materials are especially useful for optical applications like light guides. Copolymers with such a domain distribution are not subject of this invention.

The US 20080103267 describes polycarbonate-polysiloxane blockcopolymer with an average siloxane domain size of about 15 to 45 nm. Copolymers with such a domain distribution are not subject of this invention.

None of the abovementioned applications describes polysiloxane-polycarbonate block cocondensates containing special siloxane blocks and being derived from a reactive blending process. Further, siloxane-containing block condensates derived from commercially available polycarbonates, having a molecular weight of more than 4000 g/mol, exhibiting high flowability under shear and having a particular siloxane domain distribution have not yet been described in the art. These products are advantageous because their preparation requires neither large industrial facilities, such as those for the interfacial polycondensation process, nor toxic feedstocks, such as phosgene.

BRIEF SUMMARY OF THE INVENTION

Proceeding from the prior art outlined, the problem addressed was therefore that of providing siloxane-containing polycarbonate block co-condensates with high flowability under shear force, high melt stability and good chemical stability in a cost-efficient manner.

The unique property combination of deep temperature impact properties, weathering resistance and good processibility is a result of the microphase separation of the siloxane domains within the polycarbonate matrix. This microphase separation is controlled by the molecular weight of the siloxane block, the concentration of siloxane within the polycarbonate and via certain methods during interfacial manufacturing process. The interfacial process in which the siloxane block and bisphenol A are reacted with phosgene can yield a more transparent product or an opaque material. The size of the siloxane units and the distribution of the siloxane domains in the polycarbonate can control the optical transparency of the final product.

It was surprisingly found that by reacting a conventional polycarbonate with a certain functionalized siloxane compound e.g. by means of reactive extrusion or reactive blending methods a material with a special siloxane distribution could be obtained compared to siloxane containing blockcopolycarbonates made by the conventional interfacial process.

While the conventional siloxane containing blockcopolymers based on polycarbonate have the advantage of a better processability compared to standard Bisphenol A polycarbonate, it could be shown that a copolymer with similar structure derived from a reactive blending method has further improved rheological properties.

It has been found, surprisingly, that particular polysiloxane-polycarbonate block cocondensates having a certain siloxane domain size distribution are showing improved rheological properties. Further, it has been found that these co-condensates can be prepared from commercially available polycarbonates without using phosgene, but nonetheless exhibits similar positive features as siloxane-containing block co-condensates prepared by the known interfacial process with phosgene.

This is particularly surprising because the siloxane-containing polycarbonate cocondensates that are commercially available nowadays are produced via the interfacial process with phosgene, which is distinguished by a small portion of non-reacted starting material, such as monomers and siloxane components. Due to the high reactivity of phosgene, the starting materials react virtually completely to yield the condensation product. Remaining by-products, such as salts, are almost completely removed by washing, so that the co-condensate products exhibit excellent heat stability. In contrast thereto, the polysiloxane-polycarbonate block cocondensates according to the invention are prepared via a melt transesterification process. Due to the lower reactivity of the reagents, there is a higher risk that extractable residues remain in the co-condensate product. Therefore, it is particularly surprising, that the polysiloxane-polycarbonate block cocondensates according to the invention have high melt stability.

DETAILED DESCRIPTION OF THE INVENTION

The invention provides polysiloxane-polycarbonate block cocondensates having a siloxane domain distribution (diameter of siloxane domains) greater than 200 nm, measured by atomic force microscopy and light microscopy, which is in the range of 0.01%-1.5%, preferably 0.02%-1.3% and particularly preferably 0.03%-1.0% based on the total number of siloxane domains. The amount of particles (siloxane domains) having a diameter greater than 1 μm is in the range of 0.00001-0.05%, preferably in the range of 0.00005%-0.04% and particularly preferably in the range of 0.0001%-0.02%, based on the total number of siloxane domains.

In view of the fact that the polysiloxane-polycarbonate block cocondensate was derived from a melt transesterification process starting from a polycarbonate and a polysiloxane, it was very surprising that the number of particles in the nm range (below 200 nm) was large and that the number of particles having a bigger diameter (above 200 nm) was relatively small. So the polysiloxane-polycarbonate cocondensate according to the invention is characterized in that the number of particles (siloxane domains) having a diameter below 200 nm is more than 98% preferably more than 99%, based on the total number of siloxane domains.

The polysiloxane-polycarbonate block cocondensates according to the invention comprise
(A) polysiloxane blocks of the formula (1)

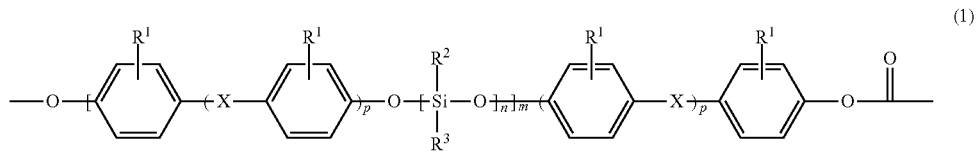

(1)

in which
R$^1$ is H, Cl, Br or C$_1$ to C$_4$-alkyl, preferably H or methyl, and especially preferably H,
R$^2$ and R$^3$ are the same or different and each independently from one another selected from aryl, C$_1$ to C$_{10}$-alkyl and C$_1$ to C$_{10}$-alkylaryl, preferably R$^2$ and R$^3$ are methyl.
X is a single bond, —CO—, —O—, C$_1$- to C$_6$-alkylene, C$_2$ to C$_5$-alkylidene, C$_5$ to C$_{12}$-cycloalkylidene or C$_6$ to C$_{12}$-arylene which may optionally be fused to further aromatic rings containing heteroatoms, X preferably being a single bond, C$_1$ to C$_5$-alkylene, C$_2$ to C$_5$-alkylidene, C$_5$ to C$_{12}$-cycloalkylidene, —O— or —CO—, X more preferably being a single bond, isopropylidene, C$_5$- to C$_{12}$-cycloalkylidene or oxygen, and most preferably isopropylidene,
n is a number from 1 to 500, preferably from 10 to 400, especially preferably from 10 to 100, most preferably from 20 to 60,
m is a number from 1 to 10, preferably from 1 to 6, especially preferably from 2 to 5, and
p is 0 or 1
and the value of n times m is preferably between 12 and 400, more preferably between 15 and 200; and (B) polycarbonate blocks having recurring units of the formula (2)

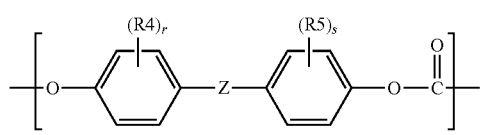

where

Z is C1 to C8 alkylidene, S, SO$_2$ or a single bond,

R4 and R5 are mutually independently a substituted or unsubstitmed C1 to C18 alkyl moiety, halogen or H, preferably methyl, ethyl, propyl, butyl, phenyl, Cl, Br, especially preferably H;

and r and s is mutually independently 0, 1, or 2.

The polysiloxane-polycarbonate block cocondensates according to the invention are characterized in that the number of particles (siloxane domains) having a diameter from 200 nm to 1 μm measured by atomic force microscopy and light microscopy is in the range of 0.01%-2.5%, preferably 0.01%-2.0%, more preferably 0,01%-1.5%, based on the total number of siloxane domains.

In a preferred embodiment, the block cocondensate contains at least one, preferably more than one, of the following structures (I) to (IV):

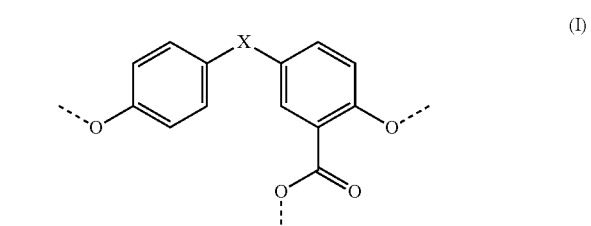

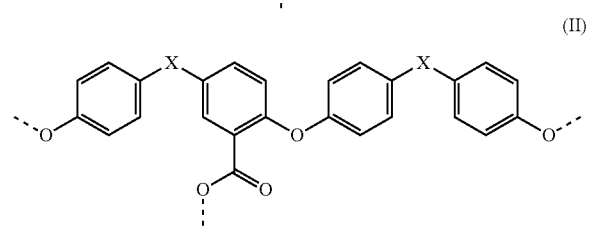

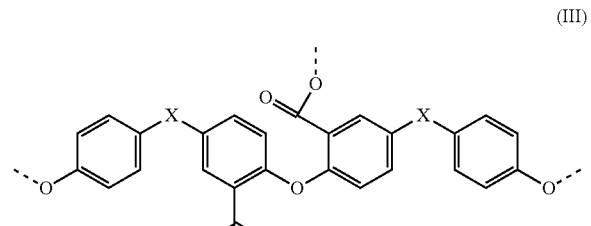

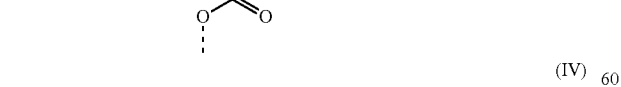

in which the phenyl rings are unsubstituted or independently mono- or disubstituted by C$_1$ to C$_3$-alkyl and/or halogen, preferably C$_1$ to C$_4$-alkyl, more preferably methyl, X is a single bond, C$_1$ to C$_6$-alkylene, C$_2$ to C$_5$-alkylidene or C$_5$ to C$_6$-cycloalkylidene, preferably a single bond or C$_1$ to C$_4$-alkylene, and especially preferably isopropylidene, the linkages indicated by—in the structural units (I) to (IV) are each part of a carboxylate group;

and wherein the amount of the structural units (I) to (IV) totals 50 to 2000 ppm, preferably 60 to 1500, more preferably 70 to 1200 ppm, and most preferably 80 to 850 ppm (determined after hydrolysis, based on the polysiloxane-polycarbonate block cocondensate).

The structural units (I), (II), (III) and/or (IV) are built into the polymer chain of the polysiloxane-polycarbonate block cocondensate, preferably into those parts of the polymer chain that are derived from the polycarbonate (component B).

Preferably, the polysiloxane-polycarbonate block cocondensate according to the invention has a relative solution viscosity of 1.26 to 1.40, more preferably of 1.27 to 1.38, and especially preferably of of 1.28 to 1.35, determined in dichloromethane at a concentration of 5 g/l at 25° C. using a Ubbelohde viscosimeter.

Preferably, the polysiloxane-polycarbonate block cocondensate according to the invention has a weight average molecular weight of 26,000 to 40,000 g/mol, more preferably 27,000 to 38,000 g/mol, and most preferably 28,000 to 35,000 g/mol, determined by measuring the relative solution viscosity in dichloromethane at a concentration of 5 g/l at 25° C. using a Ubbelohde viscosimeter, In a preferred embodiment, the polysiloxane-polycarbonate block cocondensate according to the invention has a sodium content within the range of from 0.1 ppm to 1000 ppm, preferably 0.2 to 100 ppm, more preferably 0.3 to 10 ppm and in particular 0.4 to 5 ppm, based on the total weight of the polysiloxane-polycarbonate block cocondensate. The sodium content of the cocondensate can be determined, for example, by atomic absorption spectroscopy. The rearrangement structures mentioned occur in different amounts and ratios relative to one another. The amounts thereof can be determined by total hydrolysis of the polysiloxane-polycarbonate block cocondensate.

In order to determine the amount of the rearrangement structures, the particular polysiloxane-polycarbonate block cocondensatee is subjected to a total hydrolysis and the corresponding degradation products of the formulae (Ia) to (IVa) are thus formed, the amount of which is determined by HPLC. (This can be done, for example, as follows: the polycarbonate sample is hydrolysed under reflux by means of sodium methoxide. The corresponding solution is acidified and concentrated to dryness. The drying residue is dissolved in acetonitrile and the phenolic compounds of the formula (Ia) to (IVa) are determined by means of HPLC with UV detection.

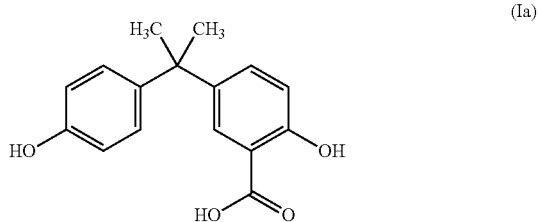

(IIa)

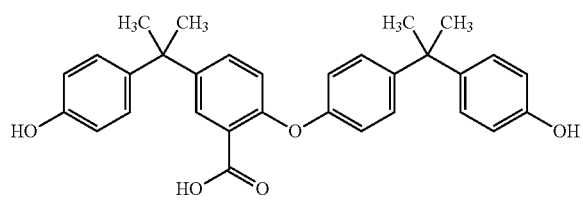

(IIIa)

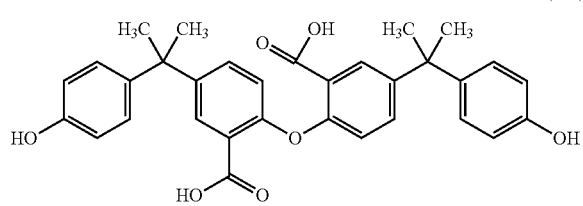

(IVa)

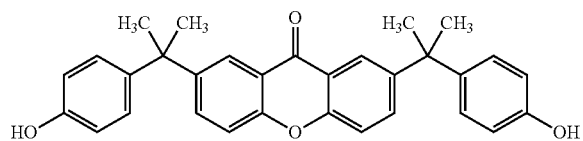

Preferably, the amount of the compound of the formula (Ia) released is 20 to 800 ppm, more preferably 25 to 700 ppm and especially preferably 30 to 500 ppm, based on the polysiloxane-polycarbonate block cocondensate.

Preferably, the amount of the compound of the formula (IIa) released is 0 (i.e. below the detection limit of 10 ppm) to 100 ppm, more preferably 0 to 80 ppm and especially preferably 0 to 50 ppm, based on the polysiloxane-polycarbonate block cocondensate.

Preferably, the amount of the compound of the formula (IIIa) released is 20 to 800 ppm, further preferably 10 to 700 ppm and more preferably 20 to 600 ppm, and most preferably 30 to 350 ppm, based on the polysiloxane-polycarbonate block cocondensate.

Preferably, the amount of the compound of the formula (IVa) released is 0 (i.e. below the detection limit of 10 ppm) to 300 ppm, preferably 10 to 250 ppm and most preferably 20 to 200 ppm, based on the polysiloxane-polycarbonate block cocondensate.

For reasons of simplification, the amount of the structures of the formula to (IV) is equated to the respective amount of the compounds of the formula (Ia) to (IVa) released.

"$C_1$-$C_4$-alkyl" in the context of the invention is, for example, methyl, ethyl, n-propyl, isopropyl, n-butyl, sec-butyl, tert-butyl; "$C_1$-$C_6$-alkyl" is additionally, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl; "$C_1$-$C_{10}$-alkyl" is additionally, for example, n-heptyl and n-octyl, pinacyl, adamantyl, the isomeric menthyls, n-nonyl, n-decyl; $C_1$-$C_{34}$-alkyl is additionally for example, n-dodecyl, n-tridecyl, n-tetradecyl, n-hexadecyl or n-octadecyl. The same applies to the corresponding alkyl radical, for example, in aralkyl or alkylaryl, alkylphenyl or alkylcarbonyl radicals. Alkylene radicals in the corresponding hydroxyalkyl or aralkyl or alkylaryl radicals are, for example, alkylene radicals corresponding to the above alkyl radicals.

"Aryl" is a carbocyclic aromatic radical having 6 to 34 skeletal carbon atoms. The same applies to the aromatic moiety of an arylalkyl radical, also called aralkyl radical, and to aryl constituents of more complex groups, for example arylcarbonyl radicals.

Examples of "$C_6$-$C_{34}$-aryl" are phenyl, o-, p-, m-tolyl., naphthyl, phenanthrenyl, anthracenyl or fluorenyl.

"Arylalkyl" or "aralkyl" is in each case independently a straight-chain, cyclic, branched or unbranched alkyl radical as defined above, which may be singly, multiply or fully substituted by aryl radicals as defined above.

The above enumerations should be understood by way of example and not as a limitation.

In the context of the present invention, ppm and ppb—unless stated otherwise—are understood to mean parts by weight.

The block copolymers of the invention are prepared by the reaction of an aromatic polycarbonate and a siloxane diol of formula (1a)

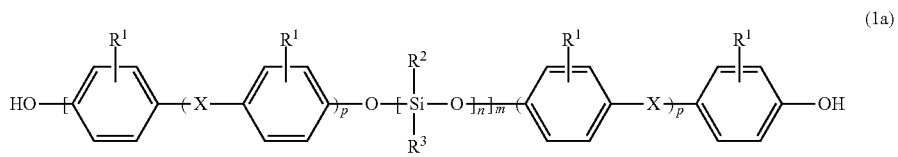

(1a)

where $R^1$, $R^2$, $R^3$ and X are as defined above. Also the indices for the repeating units p,q,n, and m are as defined above.

Polycarbonates in the context of the present invention are both homopolycarbonates and copolycarbonates.

Preferably, the polycarbonate has a weight-average molecular weight of 16 000 to 28 000 g/mol, preferably of 17 000 to 27 000 g/mol, and especially preferably of 18 000 to 26 500 g/mol, determined by means of gel permeation chromatography and BPA (bisphenol A) standard.

In a preferred embodiment, the polycarbonate has a relative solution viscosity (eta rel) of 1.16 o 1.30, preferably 1.17 to 1.28, and more preferably 1.18 to 1,27, determined in dichloromethane at a concentration of 5 g/l at 25° C. using a Ubbelohde viscosimeter.

Preferred modes of preparation of the polycarbonates, including the polyestercarbonates, proceed by the known methods from diphenols, carbonic acid derivatives and optionally branchers and chain terminators.

Methods for polycarbonate synthesis are widely known and described in numerous publications. EP-A 0 517 044, WO 2006/072344, EP-A 1 609 818, WO 2006/072344 and EP-A 1 609 818 and documents cited therein described, for example, the phase interface and melt methods for producing polycarbonate. Further information can be found in Schnell, "Chemistry and Physics of Polycarbonates", Polymer Reviews, Volume 9, Interscience Publishers, New York, London, Sydney 1964.

Diphenols suitable for preparation of polycarbonates have been described many times in the prior art.

Preferably, the polycarbonate, and thereby also the polysiloxane-polycarbonate block cocondensate according to the invention, contains structures derived from a diphenol according to general formula (2a):

wherein

D is an aromatic residue having 6 to 30 carbon atoms, which contains one or more optionally substituted aromatic rings, wherein the aromatic rings may be connected by an aliphatic residue or alkylaryl group or hetero atom bridge.

In a preferred embodiment, D is a residue according to formula (2b)

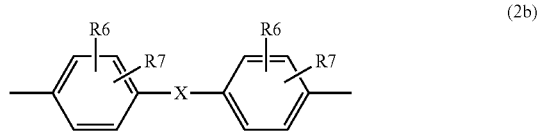

wherein $R^6$ and $R^7$ are independently of one another H, $C_1$-$C_{18}$-alkyl, $C_1$-$C_{18}$-alkoxy, halogen such as Cl or Br or an optionally substituted aryl- or aralkyl, preferably H or $C_1$-$C_{12}$-alkyl, more preferably H or $C_1$-$C_8$-alkyl, and most preferably H or methyl, and X is a single bond, —CO—, —O—, $C_1$- to $C_6$-alkylene, $C_2$ to $C_5$-alkylidene, $C_5$ to $C_{12}$-cycloalkylidene or $C_5$ to $C_{12}$-arylene which may optionally be fused to further aromatic rings containing heteroatoms, X preferably being a single bond, $C_1$ to $C_5$-alkylene, $C_2$ to $C_5$-alkylidene, —O— or —CO—, X more preferably being a single bond, isopropylidene or oxygen, and most preferably isopropylidene.

Suitable diphenols according to formula (2a) are, for example, hydroquinone, resorcinol, dihydroxydiphenyl, bis(hydroxylphenyl)alkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxylphenyl)diisopropylbenzenes, and the alkylated, ring-alkylated and ring-halogenated compounds thereof.

Preferred diphenols according to formula (2a) are 4,4'-dihydroxydiphenyl, 2,2-bis(4-hydroxyphenyl)1-phenylpropane, 1,1-bis(4-hydroxyphenyl)phenylethane, 2,2-bis(4-hydroxyphenyl)propane, 2,4-bis(4-hydroxyphenyl)2-methylbutane, 1,3-bis[2-(4-hydroxyphenyl)2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)2-methylbutane and 1,3-bis[2-(3,5-dimethyl-4-hydroxyphenyl)2-propyl]benzene.

Particularly preferred diphenols according to formula (2a) are 4,4'-dihydroxydiphenyl, 1,1-bis(4-hydroxyphenyl)phenylethane and 2,2-bis(4-hydroxyphenyl)propane, 2,2-bis(3,5-dimethyl-4-hydroxyphenyl)propane. These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff; p. 102 ff. and in D. G. Legrand, J. T. Bendier, Handbook of Polycarbonate Science and Technology, Marcel Dekker N.Y. 2000, p. 72 ff.

In the case of the homopolycarbonates, only one diphenol is used; in the case of the copolycarbonates, a plurality of diphenols are used; it will be appreciated that the diphenols used, and also all the other chemicals and assistants added to the synthesis, may be contaminated with the impurities originating from their own synthesis, handling and storage, although it is desirable to work with raw materials of maximum cleanliness.

The polycarbonates can be modified in a conscious and controlled manner by the use of small amounts of chain terminators and branching agents. Suitable chain terminators and branching agents are known from the literature. Some are described, for example, in DE-A 38 33 953. Preferably used chain terminators are phenol or alkylphenols, in particular phenol, p-tert-butylphenol, isooctylphenol, cumylphenol, the chlorocarbonic acid esters thereof or acid chlorides of monocarboxylic acids or mixtures of these chain terminators. Preferred chain terminators are phenol, cumylphenol, isooctylphenol, para-tert-butylphenol, and in particular phenol.

Examples of compounds suitable as branching agents are aromatic or aliphatic compounds having at least three, preferably three or four, hydroxyl groups. Particularly suitable examples having three or more than three phenolic hydroxyl groups are phloroglucinol, 4,6-dimethyl-2,4,6-tri(4-hydroxy-phenyl)hept-2-ene, 4,6-dimethyl-2,4,6-tri(4-hydroxyphenyl)heptane, 1,3,5-tri(4-hydroxyphenyl)-benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxy-phenyl)methane.

Examples of other trifunctional compounds suitable as branching agents are 2,4-dihydroxybenzoic acid, triniesic acid, cyanuric chloride and 3,3-bis(3-methyl-4-hydroxyphenyl)-2-oxo-2,3-dihydroindole.

Particularly preferred branching agents are 3,3-bis(3-methyl-4-hydroxyphenyl)-2-oxo-2,3-dihydro-indole and 1,1,1-tri(4-hydroxyphenyl)ethane.

The diaryl carbonates suitable for the reaction with the dihydroxyaryl compounds in the melt transesterification are those of the general formula (2c)

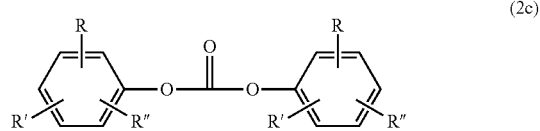

in which

R, R' and R" are the same or different and are each independently hydrogen, linear or branched $C_1$-$C_{34}$-alkyl, $C_7$-$C_{34}$-alkylaryl or $C_5$-$C_{34}$-aryl, R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl)phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, dimethyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl-phenyl carbonate, di(biphenyl-4-yl) carbonate, 4-(1-methyl-1 -phenylethyl)phenyl phenyl carbonate, di[4-(1 -methyl-1-phenylethyl)phenyl] carbonate and dimethyl salicylate) carbonate.

Very particular preference is given to diphenyl carbonate.

It is possible to use either one diaryl carbonate or else various diaryl carbonates.

The diaryl carbonates can also be used with residual contents of the monohydroxyaryl compounds from which they have been prepared. The residual contents of the monohydroxyaryl compounds may be up to 20% by weight, preferably up to 10% by weight, more preferably up to 5% by weight and most preferably up to 2% by weight.

Based on the dihydroxyaryl compound(s), generally 1.02 to 1.30 mol of the diaryl carbonate(s), preferably 1.04 to 1.25 mol, more preferably 1.045 to 1.22 mol and most preferably 1.05 to 1.20 mol per mole of dihydroxyaryl compound are used. It is also possible to use mixtures of the abovementioned diaryl carbonates, in which case the above-stated molar figures per mole of dihydroxyaryl compound relate to the total amount of the mixture of the diaryl carbonates.

The catalysts used in the melt transesterification process for preparation of polycarbonates may be the basic catalysts known in the literature, for example alkali metal and alkaline earth metal hydroxides and oxides and/or onium salts, for example ammonium or phosphonium salts. Preference is given to using onium salts in the synthesis, more preferably phosphonium salts. Such phosphonium salts are, for example, those of the general formula (3)

in which $R^{4-7}$ are identical or different, optionally substituted $C_1$-$C_{10}$-alkyl, $C_6$-$C_{14}$-aryl, $C_7$-$C_{15}$-arylalkyl or $C_5$-$C_6$-cycloalkyl radicals, preferably methyl or $C_5$-$C_{14}$-aryl, more preferably methyl or phenyl, and $X^-$ is an anion selected from the group of hydroxide, sulphate, hydrogensulphate, hydrogencarbonate, carbonate, halide, preferably chloride, and alkoxide or aroxide of the formula —$OR^8$ where $R^8$ is an optionally substituted $C_6$-$C_{14}$-aryl, $C_7$-$C_{15}$-arylalkyl, $C_5$-$C_6$-cycloalkyl or $C_1$-$C_{20}$-alkyl radical, preferably phenyl.

Particularly preferred catalysts are tetraphenylphosphonium chloride, tetraphenylphosphonium hydroxide and tetraphenylphosphonium phenoxide, very particular preference being given to tetraphenylphosphonium phenoxide.

The catalysts are used preferably in amounts of $10^{-8}$ to $10^{-3}$ mol, more preferably in amounts of $10^{-7}$ to $10^{-4}$ mol, based on one mole of dihydroxyaryl compound.

It is optionally also possible to use cocatalysts in order to increase the rate of polycondensation.

These may, for example, be alkaline salts of alkali metals and alkaline earth metals, such as hydroxides, optionally substituted $C_1$-$C_{10}$-alkoxides and $C_6$-$C_{14}$-aroxides of lithium, sodium and potassium, preferably hydroxides, optionally substituted $C_1$-$C_{10}$-alkoxides or $C_5$-$C_{14}$-aroxides of sodium. Preference is given to sodium hydroxide, sodium phenoxide or the disodium salt of 2,2-bis(4-hydroxyphenyl) propane.

If alkali metal or alkaline earth metal ions are supplied in the form of their salts, the amounts of alkali metal or alkaline earth metal ions, determined, for example, by atomic absorption spectroscopy, is 1 to 500 ppb, preferably 5 to 300 ppb and most preferably 5 to 200 ppb, based on polycarbonate to be formed. In preferred embodiments of the process according to the invention, however, no alkali metal. salts are used.

The performance of the polycarbonate synthesis may be continuous or batchwise.

The preparation of polycarbonates containing the structural elements (I) to (IV) on the industrial scale is known in principle and is described, for example, in DE 102008019503.

The weight-average molecular weight of the siloxane component is preferably 3000 to 20 000 g/mol, determined by means of gel permeation chromatography and BPA (bisphenol A) Standard, and especially preferably 3500-15 000 g/mol.

Very particular preference is given to using, as the siloxane component, hydroxyaryl-terminated siloxanes of the formula (1) where the $R^2$ and $R^3$ radicals are both methyl and the $R^1$ radical is hydrogen, and p is 0.

The siloxanes of the formula (1) can be prepared by a process including the step of reacting a linear α,ω-bisacyloxy-polydialkylsiloxane of the general formula (4) with at least one aromatic compound having at least two phenolic hydroxy groups, wherein the general formula (4) is

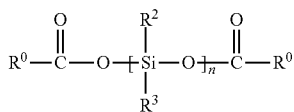

(4)

in which
R⁰ is aryl, $C_1$ to $C_{10}$-alkyl or $C_1$ to $C_{10}$-alkylaryl,
$R^2$ and $R^3$ are the same or different and each independently from one another selected from aryl, $C_1$ to $C_{10}$-alkyl and $C_1$ to $C_{10}$-alkylaryl, preferably $R^2$ and $R^3$ are both methyl, and
n is a number from 1 to 500, preferably from 10 to 400, especially preferably from 10 to 100, most preferably from 20 to 60,
and wherein the compound of formula (4) and the aromatic compound are reacted in such a molar ratio that the ratio of the phenolic hydroxyl groups in the aromatic compound to the acyloxy groups in the compound of formula (4) is less than 2.0.

In a particularly preferred embodiment, the aromatic compound having at least two phenolic hydroxy groups is a bisphenolic compound or a hydroxyl-functional oligomer thereof.

The preparation of the siloxane of formula (1) is preferably performed in an inert solvent, preferably selected from aromatic hydrocarbons such as toluene, xylenes, chlorobenzene and the like, and polar organic acids, such as acetic acid and other C3 to C6 organic carboxylic acids. The reaction can be performed in the presence of a catalyst, which is preferably selected from the metal salts of organic acids, such as sodium or potassium acetate. Other catalysts known in the art to catalysed siloxane condensation reactions can also be used.

Preferably, the polysiloxane-polycarbonate block cocondensate according to the invention is derived from a composition comprising the siloxane component of the formula (1) and the polycarbonate and which contains the siloxane component in an amount of 0.5 to 50% by weight, more preferably of 1 to 40% by weight, especially preferably of 2 to 20%, most preferably of 2.5 to 10% by weight, and in particular 2.5% by weight to 7.5% by weight, based in each case on the polycarbonate used.

Preferably, the polysiloxane-polycarbonate block cocondensate according to the invention can be obtained by reacting the component (A) with the component (B) in the melt at temperatures of 280° C. to 400° C., preferably of 300° C. to 390° C., more preferably of 320° C. to 380° C. and most preferably of 330° C. to 370° C., and pressures of 0.001 mbar to 50 mbar, preferably 0.005 mbar to 40 mbar, especially preferably 0.02 to 30 mbar, and most preferably 0.03 to 5 mbar, preferably in the presence of a catalyst.

Preference is given to reacting the polycarbonate and the siloxane by means of catalysts, it is also possible in principle to conduct the reaction without catalyst, but in that case it may be necessary to accept higher temperatures and longer residence times.

Suitable catalysts are, for example, tetra alkyl ammonium catalysts, for example tetramethylammonium hydroxide, tetramethylammonium acetate, tetramethylammonium fluoride, tetramethylammonium tetraphenylboranate, dimethyldiphenylarammonium hydroxide, tetraethylammonium hydroxide, cetyltrimethylammonium tetraphenylboranate and cetyltrimethylammonium phenoxide.

Especially suitable catalysts are phosphonium catalysts of the formula (5):

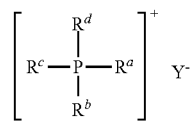

(5)

where $R^a$, $R^b$, $R^c$ and $R^d$ may be identical or different $C_1$-$C_{10}$-alkyls, $C_6$-$C_{14}$-aryls, $C_7$-$C_{15}$-arylalkyls or $C_5$-$C_6$-cycloalkyls, preferably methyl or $C_6$-$C_{14}$-aryls, more preferably methyl or phenyl, and $Y^-$ may be an anion such as hydroxide, sulphate, hydrogensulphate, hydrogencarbonate, carbonate or a halide, preferably chloride, or an alkoxide or aroxide of the formula —$OR^e$ where $R^e$ may be a $C_6$-$C_{14}$-aryl, $C_7$-$C_{15}$-arylalkyl or $C_5$-$C_6$-cycloalkyl, preferably phenyl.

Particularly preferred catalysts are tetraphenylphosphonium chloride, tetraphertylphosphonium hydroxide and tetraphenylphosphonium phenoxide; very particular preference is given to tetraphenylphosphonium phenoxide.

The catalyst is used preferably in amounts of 0.0001 to 1.0% by weight, preferably from 0.001 to 0.5% by weight, especially preferably from 0.005 to 0.3% by weight and most preferably from 0.01 to 0.15% by weight, based on the overall composition.

The catalyst can be used alone or as a catalyst mixture and be added in substance or as a solution, for example in water or in phenol (for example as a cocrystal with phenol).

Catalysts suitable for preparing the co-condensate according to the invention are those mentioned above, which are introduced into the reaction either by means of a masterbatch with a suitable polycarbonate, especially the above-described inventive polycarbonate, or can be added separately therefrom or in addition thereto.

The catalysts can be used alone or in a mixture and be added in substance or as a solution, for example in water or in phenol.

In a preferred embodiment, reaction of the siloxane of the formula (1) and the polycarbonate is performed in presence of at least one organic or inorganic salt of an acid having a $pK_A$ value within the range of from 3 to 7 (25° C.). Suitable acids include carboxylic acids, preferably $C_2$-$C_{22}$ carboxylic acids, such as acetic acid, propionic acid, oleic acid, stearic acid, laurie acid, benzoic acid, 4-methoxybenzoic acid, 3-metlaylbenzoic acid, 4-tert-butylbenzoic acid, p-tolylacetic acid, 4-hydroxybenzoic acid and salicylic acid, partial esters of polycarboxylic acids, such as monoesters of succinic acid, partial esters of phosphoric acid, such as mono- or diorgano phosphoric acid esters, branched aliphatic carboxylic acids, such as 2,2-dimethylpropanoic acid, 2,2-dimethylbutanoic acid, 2,2-dimethylpentanoic acid and 2-ethylhexanoic acid.

The organic or inorganic salt is preferably used in addition to the catalyst of formula (5); and in this embodiment the organic or inorganic salt acts as co-catalyst.

Preferably, the organic or inorganic salt is selected from the group consisting of alkali metal salts, earth alkaline metal salts, quaternary ammonium salts and quaternary phosphonium salts. Useful quaternary ammonium salts are selected from tetra-(n-butyl)-ammonium, tetraphenylammonium, tetrabenzylammonium and cetyltrimethylarnmonium salts. Useful quaternary phosphonium salts are selected from tetra-(n-butyl)-phosphonium, tetraphenylphosphonium, tetrabenzylphosphonium and cetylfrimetbylphosphonium salts. Especially preferred are alkali metal salts and earth alkaline metal salts.

Useful organic and inorganic salts are or are derived from sodium hydrogencarbonate, potassium hydrogencarbonate, hydrogencarbonate, sodium carbonate, potassium carbonate, lithium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, disodium, dipotassium and dilithium salts of bisphenol A. Furthermore the salts may include calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the respective oleates. These salts may be used singly or in combination.

In a particular preferred embodiment, the salt is selected from the group consisting of alkali metal salts and phosphonium salts of carboxylic acids.

In a preferred embodiment, the salt is derived from a carboxylic acid.

The organic or inorganic salts are used preferably in amounts of 0.5 to 1000 ppm, more preferably 1 to 100 ppm, and most preferably 1 to 10 ppm, based on the total weight of the siloxane and the organic or inorganic salt. Preferably, the organic or inorganic salts are used in amounts of 0.0005 to 5 mmol/kg, more preferably 0.001 to 1 mmol/kg, and most preferably 0.001 to 0.5 mmol/kg, based on the total weight of the siloxane, the polycarbonate and the organic or inorganic salt.

In a preferred embodiment, the organic or inorganic salt is a sodium salt, preferably a sodium salt of a carboxylic acid and is preferably used in such an amount that the sodium content in the resulting polysiloxane-polycarbonate block cocondensate is within the range of from 0.1 ppm to 1000 ppm, preferably 0.2 to 100 ppm, more preferably 0.3 to 10 ppm and in particular 0.4 to 5 ppm, based on the total weight of the polysiloxane-polycarbonate block cocondensate. The sodium content of the cocondensate can be determined, for example, by atomic absorption spectroscopy.

The organic or inorganic salt can be used alone or as a mixture and be added in substance or as a solution. In a preferred embodiment, the inorganic or organic salt is added in form of a mixture containing the siloxane and the organic or inorganic salt. Preferably, the mixture is obtained by mixing the siloxane and the organic or inorganic salt and optionally one or more polar organic compounds having up to 30, preferably up to 20 carbon atoms, and at least one heteroatom, preferably selected from O, N and S, and optionally heating the mixture, for example to a temperature of 50° C. to 300° C., until it becomes clear and then cooling to room temperature. The polar organic compound can be removed before adding the mixture to the polycarbonate or thereafter, preferably by distillation.

Suitable polar organic compounds are selected from the group consisting of organic ketones, esters and alcohols. Alcohols, especially primary alcohols having up to 20 carbon atoms, such as 1-octanol, 1-decanol, 2-ethylhexanol, 1-dodecanol, 1,2-octanediol, benzyl alcohol, ethylhexylglycerin and oleoyl alcohol are particularly preferred. Preferably, the polar organic compound has a boiling point of less than 300° C. (at 1.013 bar).

The process for preparing the block copolycarbonate according to the invention can be performed continuously or batchwise, for example in stirred tanks, thin-film evaporators, stirred tank cascades, extruders, kneaders and simple disc reactors. A continuous manufacturing process is preferred. The feedstocks may be blended together and melted from the start. In addition, the feedstocks may also be added separately from one another. For instance, the polycarbonate for use in accordance with the invention can first be melted and the siloxane component for use in accordance with the invention can be added at a later time. This can be done, for example, by means of liquid metering with an appropriate pump or via granules sprinkled on to polycarbonate. The catalyst can be added at any time, preferably at the start of the reaction or after the melting, in free form or in the form of a masterbatch. The melting can be effected under air, but preferably under a protective gas atmosphere such as nitrogen or argon, or likewise preferably under reduced pressure.

The reaction is effected under the above-specified temperatures and pressures. Preference is given to shearing the reaction mixture. This can be done by rapid stirring in a tank or by means of appropriate mixing elements such as static mixers, mixing elements on an extruder screw etc. Higher mixing is preferable over low mixing. The reaction is conducted in such a way that low molecular weight constituents such as water, phenol, linear and cyclic low molecular weight siloxane, diphenyl carbonate, bisphenol A and bisphenol A oligomers (oligocarbonates) are removed effectively.

The reactants are preferably melted under reduced pressure. According to the plant construction, during the melting phase, atmospheric pressure, preferably gentle vacuum, i.e. absolute pressures of lower than 200 mbar, especially preferably 100-200 mbar and most preferably less than 100 mbar can be applied. However, the reactants can also be melted under standard pressure, preferably under protective gas atmosphere, for example nitrogen.. The melting is preferably effected at a temperature in the range from 250 to 400° C., more preferably in the range from 280 to 380° C., most preferably in the range from 300 to 360° C. For the reaction or condensation phase, the temperatures and pressures mentioned above apply.

In a preferred embodiment, the process for preparing the block copolymers according to the invention is accomplished by using reactive extrusion or reactive blending methods. The process can be accomplished by using twin screw extruders, high viscosity kneaders or high viscosity reactors or by combination of these.

The reactive extrusion process is preferably performed in an at least two-stage process, wherein the reactor combination preferably consists of a twin- or single-shaft extruder and a high-viscosity reactor, and the low molecular weight dissociation products formed are removed by vaporization under reduced pressure. In the twin- or single-shaft extruder, the polycarbonate is melted, and the further feedstocks such as silicone component and any catalysts are also added, optionally in the form of masterbatches, in addition, the mixing and preliminary reaction of the components are effected here. The preliminary product is then fed to the high-viscosity reactor in which it reacts fully to give the polycondensation product with simultaneous supply of thermal and mechanical energy under reduced pressure. The volatile low molecular weight dissociation products and other low molecular weight constituents can be drawn off in the preliminary reactor (single- or twin-shaft extruder), downstream of the preliminary reactor and/or in the high-viscosity reactor. In a preferred embodiment, low molecular weight constituents are removed under reduced pressure at the early stage of the preliminary reactor. This is preferably done in two vacuum stages, in which case the first vacuum stage is operated preferably at an absolute pressure of 10 to 800 mbar and more preferably at an absolute pressure of 50 to 500 mbar, and the second vacuum stage preferably at absolute pressure 0.1 to 100 mbar and more preferably at absolute pressure 0.5 to 50 mbar. The reaction in the high-viscosity reactor is likewise performed under reduced pressure. The reduced pressure is 0.001 mbar to 50 mbar, preferably 0.005 mbar to 40 mbar, especially preferably 0.02 to 30 mbar and most preferably 0.03 to 5 mbar absolute.

High-viscosity reactors in accordance with the invention are apparatuses suitable for processing high-viscosity materials, which provide sufficient residence time with good mixing and subject the melt to the reduced pressure required in accordance with the invention. The patent literature describes numerous apparatuses which meet these requirements in principle and which can be used in accordance with the invention. For example, it is possible to use reactors according to EP 460 466 (LeA27024), EP 528 210, EP 638 354, EP 715 881, EP 715 882, EP 798 093, or those according to EP 329 092, according to EP 517 068, EP 1 436 073 or WO 20021114, or those according to EP 222 599.

Other apparatuses of the state of the art, which can be utilized according to the invention, may be found in Albalak et al. "Polymer devolatilization", Marcel Dekker, New York 1996 (therein chapter 8).

Preference is given to using a reactor according to EP 460 466 (LeA27024), which has kinematic self-cleaning, and consists of two or more parallel shafts which rotate in the same sense, on which there are axially offset, not necessarily circular discs with strippers distributed on the circumference thereof, and surrounding housing. This reactor/mixer is characterized in that all surfaces of the strippers are kinematically cleaned, in that, especially with shafts rotating at equal speed, in any radial section through the mixer, all outward-pointing surfaces of the strippers a shaft are concentric to the centre of rotation if they are cleaned by the housing, but otherwise have approximately the axis separation as the radius of curvature and are convex and are cleaned by an adjacent shaft or the strippers thereof, in that, especially with rotors rotating at equal speed, all inward-pointing surfaces of the strippers of a shaft, in any radial section through the mixer, have approximately the axis separation as the radius of curvature and are concave and are cleaned by strippers of another adjacent shaft. For better mixing, the melt can be conducted through further mixing elements. For example, a static mixture can be used between the preliminary reactor and the high-viscosity reactor.

For discharge of the reacted cocondensates from the high-viscosity reactor, in accordance with the invention, a single-shaft screw, a twin-shaft screw or a gear pump is used. Optionally, additives and/or admixtures are also fed and mixed in. The admixtures can be mixed in in the discharge unit or in a downstream static mixer. The melt is formed by means of one or more nozzles and comminuted with a pelletizing apparatus according to the prior art.

It is particularly preferred to operate the manufacturing process for the cocondensates in a continuous way as described above.

Granules are obtained, if possible, by direct spinning of the melt and subsequent granulation, or else through use of discharge extruders or gear pumps, by which spinning is effected in air or under liquid, usually water. If extruders are utilized, additives can be added to the melt upstream of this extruder, optionally with use of static mixers or by means of side extruders in the extruder.

It is possible to add additives and/or fillers and reinforcers to the polysiloxane-polycarbonate block cocondensate according to the invention. Additives are preferably used in amounts of 0% by weight to 5.0% by weight, more preferably 0% by weight to 2.0% by weight, and most preferably 0% by weight to 1.0% by weight. The additives are standard polymer additives, for example the following which are described in EP-A 0 839 623, WO-A 96/15102, EP A 0 500 496 or "Plastics Additives Handbook", Hans Zweifel, 5th Edition 2000, Hauser Verlag, Munich: flame retardants, UV stabilizers, gammx stabilizers, antistats, optical brighteners, flow improvers, thermal stabilizers, inorganic pigments, demoulding agents or processing aids. Fillers and/or reinforcers can be used in amounts of 0% by weight to 50% by weight, preferably 0% by weight to 20% by weight, more preferably 0% by weight to 12% by weight, and in particular 0% by weight to 9% by weight.

These additives, tillers andlor reinforcers can be added to the polymer melt individually or in any desired mixtures or a plurality of different mixtures, and additives can specifically be supplied directly in the course of insulation of the polymer (for example via a side unit such as a side extruder) as a pure substance or as a masterbatch in polycarbonate, or else after melting of granules in a compounding step. The additives or mixtures thereof can be added to the polymer melt in solid form, i.e. as a powder, or as a melt. Another method of metered addition is the use of masterbatches or mixtures of masterbatches of the additives or additive mixtures.

Moreover, the polysiloxane-polycarbonate block cocondensate according to the invention can be provided with thermal stabilizers or processing stabilizers. Preferentially suitable are phosphites and phosphonites, and also phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4di-tert-butylphenyl) pentaerythrityl diphosphite, bis(2,4-di-cumylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)4,4'-biphenylene diphosphonite, 6-isooctyloxyl-2,4,8,10-tetra-tert-butyl-12H-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenzo[d,g]-1,3,2-dioxaphosphocin, 2,2',2''-nitrilo-[triethyl tris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythrityl diphosphite, triphenylphosphine (TPP), trialkylphenylphosphine, bisdiphenylphosphinoethane or a trinaphthylphosphine. Especially preferred are triphenylphosphine (TPP), Irgafos® 168 (tris(2,4-di-tert-butylphenyl) phosphite) and tris(nonylphenyl) phosphite, or mixtures thereof.

It is additionally possible to use phenolic antioxidants such as alkylated monophenols, alkylated thioalkylphenols, hydroquinones and alkylated hydroquinones. Particular preference is given to using Irganox® 1010 (pentaerythrityl 3-(4-hydroxy-3,5-di-tert-butylphenyl)propionate; CAS:

6683-19-8) and Irganox 1076® (2,6-di-tert-butyl-4-(octadecanoxycarbonylethyl)phenol).

Suitable UV absorbers are described, for example, in EP 1 308 084 A1, in DE 102007011069 A1, and in DE 10311063 A1.

Particularly suitable ultraviolet absorbers are hydroxybenzotriazols such as 2-(3',5'-bis(1,1-dimethylbenzyl)2'-hydroxyphenyl)benzotriazole (Tinuvin® 234, BASF SE, Ludwigshafen), 2-(2'-hydroxy-5'-(tert-octyl)phenyl) benzotriazole (Tinuvin® 329, BASE SE, Ludwigshafen), 2-(2'-hydroxy-3'-(2-butyl)5'-(tert-butyl)phenyl)benzotriazole (Tinuvin® 350, BASF SE, Ludwigshafen), bis(3-(2H-benztriazolyl)2-hydroxy-5-tert-octyl)methane, (Tinuvin® 360, BASF SE, Ludwigshafen), 2-(4,6-diphenyl-1,3,5-triazin-2-yl)5-(hexyloxy)phenol (Tinuvin® 1577, BASF SE, Ludwigshafen), and the benzophenones 2,4-dihydroxybenzophenone (Chirnasorb® 22, BASF SE, Ludwigshafen) and 2-hydroxy-4-(octyloxy)benzophenone (Chimassorb® Si, BASF SE, Ludwigshafen), 2-cyano-3,3-diphenyl-2-propenoic acid, 2,2-bis[[(2-cyano-1-oxo-3,3 -diphenyl-2-propenypoxylmethyl]1,3-propanediyl ester (9CI) (Uvinul® 3030, BASF AG Ludwigshafen), 2-[2-hydroxy-4-(2-ethylhexyl) oxylphenyl-4,6-di(4-phenyl)phenyl-1,3,5-triazine (Tinuvin® 1600, BASF SE, Ludwigshafen) or tetra ethyl-2,2'-(1,4-phenylenedimethylidene)bismalonate (Hostavin® B-Cap, Clariant AG).

It is also possible to use mixtures of these ultraviolet absorbers.

Moreover, the polysitoxane-polycarbonate block cocondensate according to the invention can he provided with demoulding agents, Particularly suitable demoulding agents for the inventive composition are pentaerythrityl tetrastearate (PETS) or glyceryl monostearate (GMS).

In addition, it is also possible to add other polymers to the block cocondensate according to the invention, for example polycarbonate, polyester carbonate, polystyrene, styrene copolymers, aromatic polyesters such as polyethylene terephthalate (PET), PET-cyclohexanedirnethanol copolymer (PETG), polyethylene naphthalate (PEN), polybutylene tereplithalate (PBT), cyclic polyolefin, poly- or copolyacrylates and poly- or copolymethacrylate, for example poly- or copolymethylmethacrylates (such as PMMA), and copolymers with styrene, for example transparent polystyrene-acrylonitrile (PSAN), rubber-modified vinyl (co-)polymers, such as acrylonitrile butadiene styrene copolymer, thermoplastic polyurethanes, polymers based on cyclic olefins (e.g. TOPAS®, a commercial product from Ticona).

The block cocondensates according to the invention can be processed in a manner known for thermoplastic polycarbonates to give any desired mouldings.

In this context, the inventive co-condensates can be converted, for example, by hot pressing, spinning, blow-moulding, thermoforming, extrusion or injection moulding to products, mouldings or shaped articles. Also of interest is the use of multilayer systems. The application may coincide with or immediately follow the shaping of the base structure, for example by coextrusion or multicomponent injection moulding. However, application may also be on to the ready-shaped base structure, for example by lamination with a film or by coating with a solution.

Sheets or mouldings composed of base layer and optional top layer/optional top layers (multilayer systems) can be produced by (co)extrusion, direct skinning, direct coating, insert moulding, film insert moulding, or other suitable processes known to those skilled in the art.

Injection moulding processes are known to those skilled in the art and are described, for example, in "Handbuch Spritzgiessen", Friedrich Johannnaber/Walter Michaeli, Munich; Vienna: Hanser, 2001. ISBN 3-446-15632-1 or "Anleitung zum Ban von Spritzgiesswerkzeugen", Menges/Michaeli/Mohren, Munich; Vienna: Hanser, 1999, ISBN 3-446-21258-2.

Extrusion processes are known to those skilled in the art and are described, for example, for coextrusion, inter alba, in EP-A 0 110 221, EP-A 0 110 238 and EP-A 0 716 919. For details of the adapter and nozzle process, see Johannaber/Ast: "Kunststoff-Maschinenführer", Hanser Verlag, 2000 and in Gesellschaft Kunststofflechnik: "Coextrudierte Folien and Platten: Zukurtftsperspektiven, Anforderungen, Anlagen and Herstellung, Qualitassicherung", VDI-Verlag, 1990.

The polysiloxane-polycarbonate block cocondensates according to the invention are usable wherever the known aromatic polycarbonates have been used to date, and wherever good flowability coupled with improved demoulding characteristics and high toughness at low temperatures and improved chemical resistance are additionally required, for example for production of large external motor vehicle parts and switch boxes for exterior use, and of sheets, cavity sheets, electric and electronic parts, and optical memory. For example, the block cocondensates can be used in the IT sector for computer housings and multimedia housings, mobile phone cases, and in the domestic sector, such as in washing machines, and in the sports sector, for example as a material for helmets.

FIG. 1 shows a schematic representation of a setup for the preparation of siloxane-containing block copolycarbonates according to the invention. Polycarbonate and eventually a catalyst masterbatch of polycarbonate are metered via gravimetric feeders (4) and (5) to an extruder (1). Preferably a co-rotating twin-screw extruder exhibiting one or more vent sections is used. The screw configuration is designed according to the state of the art and is therefore not shown. The polysiloxane block is stored in a storage tank (6) and is metered to the extruder via a displacement pump (7). In a preferred embodiment, as shown in FIG. 1, there are four vented housings on the extruder. Vacuum is generated via two vacuum pumps (8) and the vapours, which are distracted from the extruder are condensed in two condensers (9). Configurations with less but with at least one vented housing or with only one vacuum level applied are also according to the invention. The premixed and devolatized melt is transferred to a high viscosity reactor (2), which is also connected to a vacuum pump (8) and a condenser (9). After completion of the reaction the polysiloxane-polycarbonate block cocondensates are discharged from the high viscosity reactor via a discharge screw (3). The polymer strands are cooled in a waterbath (10) and cut in a granulator (11).

EXAMPLES

The invention is described in detail hereinafter by working examples, the determination methods described here being employed for all corresponding parameters in the present invention, in the absence of any descriptions to the contrary.

Determination of Melt Volume Flow Rate (MVR):

The melt volume flow rate (MVR) is determined to ISO 1133 (at 300° C.; 1.2 kg), unless any other conditions have been described.

Determination of Solution Viscosity (eta rel):

The relative solution viscosity ($\eta_{rel}$; also referred to as eta rel) was determined in dichloromethane at a concentration of 5 g/l at 25° C. with an Ubbelohde viscometer.

Light Microscopy (To Investigate the Incorporation of the Siloxane Component):

The incorporation characteristics of the siloxane component are checked via light microscopy. The presence of large amounts (in the micrometer range or greater) of silicone oil is a pointer to physical incorporation of the silicone component. No block cocondensate is present. If in contrast, the average size of the silicone domains is below 1 µm, the presence of a block copolymer can be assumed.

Siloxane Domain Distribution by Atomic Force Microscopy (AFM) and Light Microscopy The siloxane domain distribution was analysed by by using atom force microscopy and light microscopy. An injection molded test bar (80×10×4 mm) of the respective sample was cut in the center of the test bar by using an ultra-microtome at liquid nitrogen temperature. A sample was prepared and the AFM image was taken by looking on the flow direction (flow direction of injection molded part). The images were recorded in ambient conditions (25° C., 30% relative humidity) and in soft intermittent contact mode or tapping mode. A tapping mode cantilever (Nanoworld pointprobe) with a typical spring constant of about 2.8 $Nm^{-1}$ and a resonance frequency around 75 kHz was used for scanning. Tapping force was controlled by the ratio between setpoint amplitude and the free air amplitude. The scan rate was adjusted in the range of 1 Hz depending on the image quality. For acquisition of surface morphology, phase contrast and height images were recorded on a 2.5 µm×2.5 µm area. As AFM a Bruker D3100 microscope was used. The particles were analysed automatically by means of image evaluation by Olympus SIS (Olympus Soft Imaging Solutions GmbH, 48149, Münster, Germany) via light/dark contrast. The diameter of the particles were determined according to the diameter of the projected area-equivalent circle. To evaluate siloxane domains greater than 1 µm a Zeiss Axioplan 2 light microscope was used. The size distribution was analysed as described for the AFM images. The area evaluated by light microscopy was about e.g. 735000 µm$^2$ and the area evaluated by AFM was about 6.25 µm$^2$. The domain size distribution of the particles were recalculated using the surface ratio between AFM-area and light microcopy area.

Materials Used:

Polycarbonate (PC) used for the synthesis of the cocondensates according to the invention: linear bisphenol A polycarbonate having end groups based on phenol from Bayer MaterialScience used with a melt volume index of 59-62 cm$^3$/10 min (measured at 300° C. and load 1.2 kg to ISO 1033). This polycarbonate does not contain any additives such as UV stabilizers, demoulding agents or thermal stabilizers. The polycarbonate was prepared via a melt transesterification process as described in DE 102008019503. The polycarbonate has a phenol end group content of about 600 ppm, Siloxane Component:

The siloxane used is hydroquinone-terminated polydimethylsiloxane of the formula (1a) (i.e. $R^1$=H, $R^2$, $R^3$=methyl, p=0), in which n=30 and m=3, having a hydroxy content of 8.8 mg KOH/g and a viscosity of 753 mPa·s (23° C.).

The weight-average molecular weight is Mw =13 000 g/mol, determined by means of gel permeation chromatography (GPC) with bisphenol A standard; detection was effected by means of an a detector at 1050 cm$^{-1}$.

The siloxane component can be prepared according to the following procedure:

In a reaction flask equipped with a thermostat heater, stirrer, thermometer, and reflux condenser, 250 g of an α,ω-bisacyloxypolydimethylsiloxane, with an average chain length of 31.8 dimethylsiloxy units as determined by $^{29}$Si NMR and 230 mmoles of acyloxy terminal groups, is added dropwise over 4 hours to a solution of 35.1 g (150 mmoles) bisphenol-A in 50 g xylenes, 25 g acetic acid and 0.5 g of sodium acetate, while heating to a mild reflux at 105 ° C. After complete addition the clear solution is stirred for an additional hour. Then the solvents and volatiles are removed by vacuum distillation to 160° C. and 3 mbar pressure. After cooling the crude product is filtered over a 3 micron filter (Seitz K300) to give 236 g (83% theory) of a clear, colorless liquid.

Catalyst:

The catalyst used is tetraphenylphosphonium phenoxide from Rhein Chemie Rheinau GmbH (Mannheim, Germany) in the form of a masterbatch. Tetraphenylphosphonium phenoxide is used in the form of a cocrystal with phenol and contains about 70% tetraphenylphosphonium phenoxide. The amounts which follow are based on the substance obtained from Rhein Chemie (as a cocrystal with phenol).

The masterbatch is used in the form of a 0.25% mixture. For this purpose, 4982 g are subjected to spin application of 18 g of tetraphenyiphosphonium phenoxide in a drum hoop mixer for 30 minutes. The masterbatch is metered in in a ratio of 1:10, such that the catalyst is present with a proportion of 0.025% by weight in the total amount of polycarbonate.

Materials Used for Comparative Examples:

Makrolon® 2808: Linear polycarbonate from Bayer MaterialScience based on bisphenol A with phenol as end group with an MVR of 9.5. (for Lexan® EXL 1414T: Linear siloxane-containing block cocondensate from Sabic Innovative Plastics based on bisphenol A with an MVR of 7.3, prepared by the via an interfacial process.

Lexan® EXL 9330: Linear siloxane-containing block cocondensate comprising flame retardant from Sabic innovative Plastics based on bisphenol A with an MVR of 8.8, prepared via an interfacial process.

Example 3

Preparation of Polysiloxane-Polycarbonate Block Cocondensate Manufactured by an Interphase Process (Comparative Example)

25 liters of methylene chloride were added to a solution, rendered inert with nitrogen, of 2185 g (9.57 mol) of bisphenol A and 1687 g (42.16 mol) of sodium hydroxide in 25 liters of water, 115 g (about 5% by weight related to the amount of bisphenol A) of siloxane component (see above) was added. 1896 g (19.17 mol) of phosgene were introduced at a pH of from 12.5 to 13.5 and at 20° C. 30% sodium hydroxide solution was added during the phosgenation in order to prevent the pH from falling below 12.5. When the phosgenation was complete, and after flushing with nitrogen, 65.4 g (0.43 mol) of 4-tert-butylphenol (technical grade from Sigma-Aldrich, USA) dissolved in 2 liter of dichloromethane were added. Stirring was carried out for 10 minutes, and 11 g (0.1 mol) of N-ethylpiperidine dissolved in 0.5 liter dichloromethane were added, and stirring was continued for one hour. The aqueous phase was separated off, and then the organic phase was acidified with phosphoric acid and washed with distilled water until neutral and free of salt. After replacing the solvent with chlorobenzene, the product was extruded by means of an evaporation extruder at 290° C. and about 80 revolutions/minute at 0.1 mbar and granulated by means of a granulator.

Manufactoring of Block Copolymers (Inventive)

The block copolymer according to the invention is produced in set up depicted in FIG. 1.

Polycarbonate and a catalyst masterbatch of polycarbonate are metered via gravimetric feeders (4) and (5) to an extruder (1). A co-rotating twin-screw extruder exhibiting several vent sections is used (see below). The screw configuration is designed according to the state of the art and is therefore not shown. The polysiloxane block is stored in a storage tank (6) and is metered to the extruder via a displacement pump (7). In a preferred embodiment, as shown in FIG. 1, there are four vented housings on the extruder. Vacuum is generated via two vacuum pumps (8) and the vapours, which are distracted from the extruder are condensed in two condensers (9). Configurations with less but with at least one vented housing or with only one vacuum level applied are also according to the invention, The premixed and devolatized melt is transferred to a high viscosity reactor (2), which is also connected to a vacuum pump (8) and a condenser (9). After completion of the reaction the polysiloxane-polycarbonate block cocondensates are discharged from the high viscosity reactor via a discharge screw (3). The polymer strands are cooled in a waterbath (10) and cut in a granulator (11).

For the extruder (1), a twin-screw extruder (ZSE 27 MAXX from Leistritz Extrusionstechnik GmbH, Nuremberg) is used. The extruder consists of 11 housing parts see FIG. 1. In housing part 1 polycarbonate and catalyst masterbatch are added, and in housing 2 and 3 these components are melted. In housing part 4 the liquid silicone component is added. Housing parts 5 and 6 serve for incorporation of the silicone component. Housings 7 to 10 are provided with venting orifices in order to remove the condensation products. Housings 7 and 8 are assigned to the first vacuum stage, and housings 9 and 10 to the second. The reduced pressure in the first vacuum stage is between 250 and 500 mbar absolute pressure. The reduced pressure in the second vacuum stage can be found in Table 1. is less than 1 mbar. In zone 11, finally, the pressure buildup is effected, and then the product is pumped into the second reactor (high viscosity reactor).

The high viscosity reactor used in the inventive example is built according to EP460466. It has two horizontal rotors, which are axially parallel. The rotor diameter is 190 mm and the reactor has a retention volume of 45 liters. It is built with a large opening for the distraction of vapours at the top and allows operation under low pressure. The typical operating pressure according to the invention is 1 mbar absolute. The reactor is operated at a turn speed of 30 rpm, delivering a good surface renewal and a low degree of fill in the machine. The mean residence time in the high viscosity reactor was determined to be about 40 minutes for the inventive examples 1 and 2.

TABLE 1

Inventive Examples (use of a reactor combination of a twin-screw extruder and a high-viscosity reactor as depicted in FIG. 1)

| Ex. | PC kg/h | Cat. MB kg/h | Cat. % | Siloxane kg/h | Speed rpm | Vacuum | Housing temperature ° C. | Viscosity. Eta rel | Incorporation (light microscopy) |
|---|---|---|---|---|---|---|---|---|---|
| 1[1)] | 13.5 | 1.5 | 0.25 | 0.75 | 200 | 200 mbar (TSE Z2) 0.9 mbar (HVR) | 350 (TSE) 350 (HVR) | 1.294 | yes |
| 2 | 13.5 | 1.5 | 0.25 | 0.75 | 400 | 120 mbar (TSE Z2) 0.5 mbar (HVR) | 350 (TSE) 350 (HVR) | 1.282 | yes |

[1)]Concentration of the rearrangement structures contained in the cocondensate: (Ia) 65 ppm, (IIa) 51 ppm, (IIIa) 14 ppm and (Iva) 23 ppm, based on the cocondensate and determined after hydrolysis.

Inventive Examples 1 and 2 show that a high molecular weight product can be achieved in the inventive machine configuration. The solution viscosities of the products which have been obtained via a reactive extrusion are within the range from high-viscosity injection moulding or extrusion types.

It was shown by light microscopy images that a homogeneous distribution of the silicone domains is present.

The shear viscosities of the block cocondensate obtained by the process according to the invention and of conventional commercially available siloxane-containing block eocondensates and conventional linear polycarbonates based on hisphenol A are shown in Table 2.

TABLE 2

Shear viscosities at various shear rates at 300° C. (high-pressure capillary rheometer)

| Shear rate [s⁻¹] | Makrolon ® 2808 (Comparative example) viscosity [Pas] | Lexan ® EXL1414T (Comparative example) viscosity [Pas] | Lexan ® EXL9330 (Comparative example) viscosity [Pas] | Example 1 (Inventive example) viscosity [Pas] | Example 2 (Inventive example) viscosity [Pas] |
|---|---|---|---|---|---|
| 50 | 570* | 525 | 484 | 547 | 451 |
| 100 | 554 | 479 | 437 | 484 | 407 |
| 200 | 532 | 417 | 387 | 397 | 336 |
| 500 | 456 | 332 | 315 | 270 | 232 |
| 1000 | 363 | 258 | 243 | 201 | 165 |
| 1500 | 302 | 216 | 202 | 169 | 138 |

*value at 50 s⁻¹ extrapolated

It is apparent from Table 3 that the viscosity decreases significantly at relatively high shear rates in the inventive examples. For example, in the case of linear polycarbonate (Makrolon® 2808), the viscosity, with comparable zero viscosity is higher under high shear rates than in the case of the inventive examples. Surprisingly, the flowability, with similar or even higher starting viscosity, for the inventive materials is thus higher under shear compared to conventional, commercially available siloxane block copolycarbonates obtained in the interfacial process. This was surprising and unforeseeable.

TABLE 3

Melt stability (MVR 300° C. after various residence times)

| Residence time [min] | Makrolon 2808 (Comparative example) MVR | Lexan EXL1414T (Comparative example) MVR | Lexan EXL9330 (Comparative example) MVR | Example 1 (Inventive example) MVR | Example 2 (Inventive example) MVR |
|---|---|---|---|---|---|
| 4 | 9.76 | 7.28 | 8.75 | 3.11 | 10.39 |
| 20 | 9.77 | 7.04 | 10.61 | 8.10 | 10.37 |
| 30 | 9.84 | 8.35 | 11.0 | 7.90 | 10.29 |
| Δ (4/30 min) | 0.08 | 1.07 | 2.25 | 0.21 | 0.1 |

Surprisingly, the inventive samples (Examples 1 and 2), in spite of production in a reactive extrusion process, exhibit a high melt stability. The melt stability is surprisingly even higher than in the case of siloxane-containing polycarbonates which have been obtained in the interfacial process.

Mechanical Behavior at Different Wall Thickness:

For the mechanical trials test bars with a wedge-shaped geometry were prepared by injection molding.

V-notches were applied on the wedge shaped samples at different positions (different thicknesses). The samples had V-shaped notches with a notch radius of 0.10 mm and 0.25 mm at different thicknesses.

A three point bending test was performed at each sample at room temperature.

Figure 2:
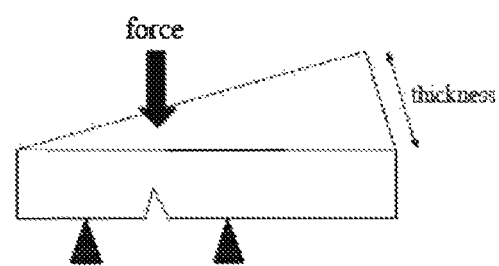

The trials were performed on an Instron 5566 testing machine with a strain rate of 10 mm/min with 42 mm distance between the support edges (see FIG. 2).

TABLE 4

| | Makrolon 2808 (Comparative example) | Example 1 (inventive example) |
|---|---|---|
| Critical thickness (0.10 mm) | 5.65 ± 0.05 mm | >7.0 mm |
| Critical thickness (0.25 mm) | 6.75 ± 0.25 mm | >7.0 mm |

It could be shown that the critical thickness is higher for the material according to the invention when compared to a standard polycarbonate material. The standard polycarbonate sample shows a critical thickness of 5.65 mm for a notch radius of 0.1 mm whereas the inventive material is still ductile at this thickness (critical thickness higher than 7.0 mm).

Siloxane Domain Distribution:

TABLE 5

| Siloxane domain size | Example 1 (inventive) | Example 2 (inventive) | L.EXL1414T (comparison) | L. EXL9330 (comparison) | Example 3 (comparison) |
|---|---|---|---|---|---|
| <200 nm [%] | 99.0 | 99.6 | 100 | 99.7 | 100 |
| >200 nm [%] | 1.0 | 0.4 | 0 | 0.3 | 0 |
| >1 μm [%] | 0.02 | 0.007 | 0 | 0 | 0 |
| d min [nm] | 11 | 11 | 11 | 11 | 11 |
| d max | 45 μm | 48 μm | 80 nm | 560 nm | 130 nm |
| Dn10 | 19 | 19 | 12 | 14 | 14 |
| Dn50 | 39 | 34 | 18 | 30 | 30 |
| Dn90 | 77 | 53 | 30 | 70 | 51 |

$D_n90$ value = maximum particle diameter for a given percentage of particles in the sample meaning that 90% of particles are below the given value in diameter. The same applies for the $D_n50$ and $D_n10$ values (relating to 50% and 10%).
d min means diameter of the smallest siloxane domain.
d max means the diameter of the largest siloxane domain.

The invention claimed is:

1. A polysiloxane-polycarbonate block cocondensate derived from a continuous melt transesterification process comprising
   (A) polysiloxane blocks of the formula (1)

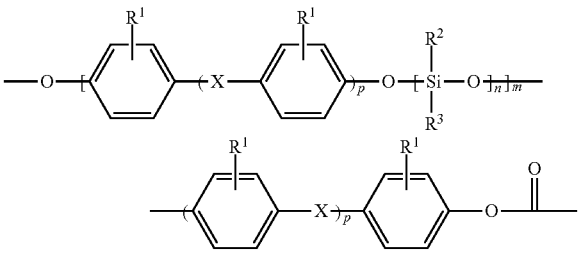

(1)

in which
   $R^1$ is H, Cl, Br or $C_1$ to $C_4$-alkyl,
   $R^2$ and $R^3$ are the same or different and each independently from one another selected from aryl, $C_1$ to $C_{10}$-alkyl and $C_1$ to $C_{10}$-alkylaryl,
   X is a single bond, —CO—, —O—, $C_1$- to $C_6$-alkylene, $C_2$ to $C_5$-alkylidene, $C_5$ to $C_{12}$-cycloalkylidene or $C_6$ to $C_{12}$-arylene which may optionally be fused to further aromatic rings containing heteroatoms,
   n is a number from 1 to 500,
   m is a number from 1 to 10, and
   p is 0 or 1;
   (B) and polycarbonate blocks having recurring units of the formula (2)

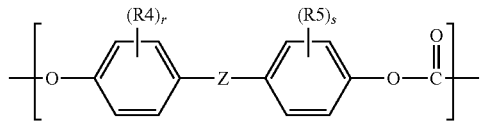

(2)

where
   Z is C1 to C8 alkylidene, S, $SO_2$ or a single bond,
   R4 and R5 are mutually independently a substituted or unsubstituted C1 to C18 alkyl moiety, halogen or H; and r and s is mutually independently 0, 1, or 2;
   wherein the polysiloxane-polycarbonate block cocondensate has a siloxane domain distribution (diameter of siloxane domains) from 200 nm to 1 μm measured by atomic force microscopy and light microscopy which is in the range of 0.01%-2.5%, based on the total number of siloxane domains.

2. The polysiloxane-polycarbonate block cocondensate according to claim 1, which has a siloxane domain distribution (diameter of siloxane domains) from 200 nm to 1 μm measured by atomic force microscopy and light microscopy which is in the range of 0.01%-1.5%, based on the total number of siloxane domains.

3. The polysiloxane-polycarbonate block cocondensate according to claim 1, which has an average siloxane domain size (diameter of siloxane domains) of greater than 200 nm, measured by atomic force microscopy and light microscopy, which is in the range of 0.01%-1.5%, based on the total number of siloxane domains, and which contains particles (siloxane domains) having a diameter greater than 1 µm in an amount of 0.00001%-0.05% based on the total number of siloxane domains.

4. The polysiloxane-polycarbonate block cocondensate according to claim 1, wherein the siloxane domain distribution (diameter of siloxane domains) from 200 nm to 1 µm measured by atomic force microscopy and light microscopy is in the range of 0.03%-1.0%, based on the total number of siloxane domains.

5. The polysiloxane-polycarbonate block cocondensate according to claim 1, which contains siloxane domains having a diameter of at least 1 µm.

6. The polysiloxane-polycarbonate block cocondensate according to claim 1 containing at least one of the following structures (I) to (IV):

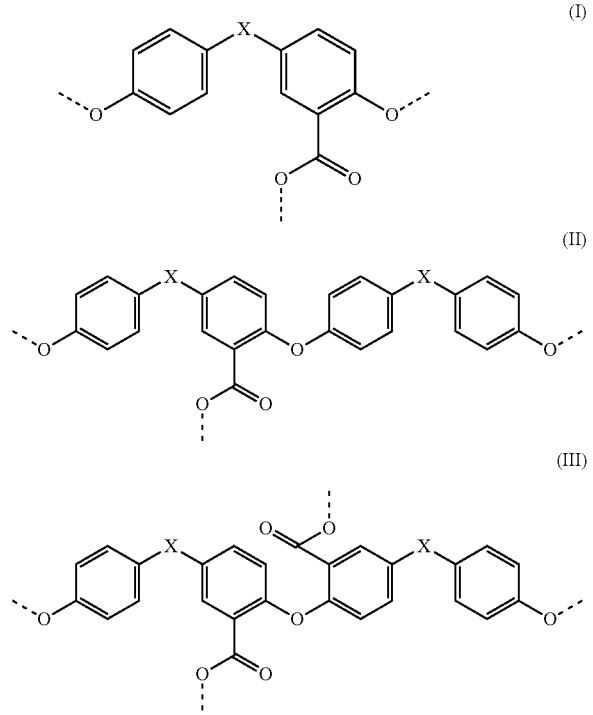

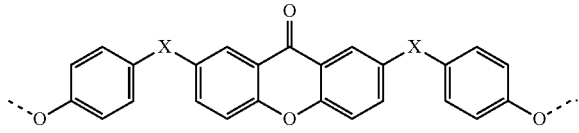

in which the phenyl rings are unsubstituted or independently mono- or disubstituted by $C_1$ to $C_8$-alkyl and/or halogen, X is a single bond, $C_1$ to $C_6$-alkylene, $C_2$ to $C_5$-alkylidene or $C_5$ to $C_6$-cycloalkylidene, the linkages indicated by—in the structural units (I) to (IV) are each part of a carboxylate group.

7. The polysiloxane-polycarbonate block cocondensate according to claim 1, wherein the amount of the structural units (I) to (IV) totals 50 to 2000 ppm (determined after hydrolysis, based on the polysiloxane-polycarbonate block cocondensate).

8. The polysiloxane-polycarbonate block cocondensate according to claim 1, wherein $R^1$ is H, p is 1 and X is isopropylidene.

9. The polysiloxane-polycarbonate block cocondensate according to claim 1, wherein $R^2$ and $R^3$ are methyl.

10. The polysiloxane-polycarbonate block cocondensate according to claim 1, wherein n is a number from 10 to 100 and m is a number from 2 to 5.

11. The polysiloxane-polycarbonate block cocondensate according to claim 1 comprising a sodium content within the range of from 0.1 ppm to 1000 ppm.

12. A method comprising providing the polysiloxane-polycarbonate block cocondensate according to claim 1 and preparing a moulding.

13. A moulding or extrudate comprising the polysiloxane-polycarbonate block cocondensate according to claim 1.

14. The polysiloxane-polycarbonate block cocondensate according to claim 1, wherein X is a single bond, $C_1$ to $C_5$-alkylene, $C_2$ to $C_5$-alkylidene, $C_5$ to $C^{12}$-cycloalkylidene, —O— or —CO—.

15. The polysiloxane-polycarbonate block cocondensate according to claim 1, wherein the value of n times m is between 12 and 400.

* * * * *